Figure 4:
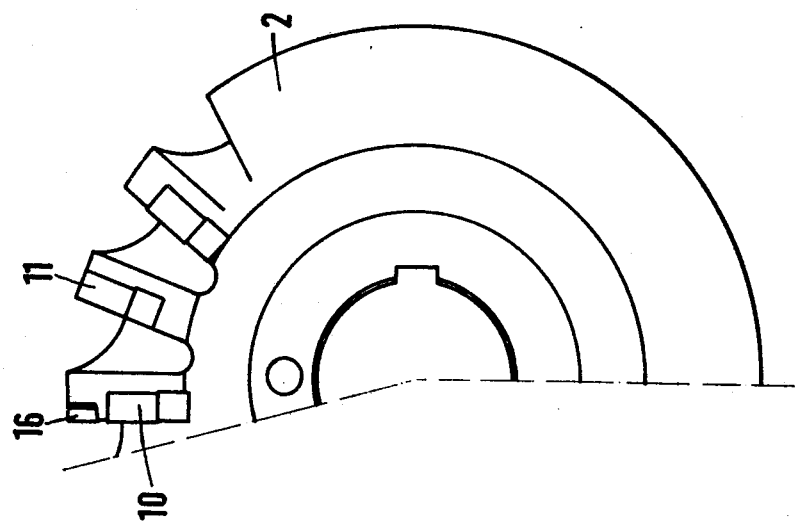

United States Patent [19]

Langen

[11] 4,218,159

[45] Aug. 19, 1980

[54] MULTIPLE-PART HOBBING CUTTER

[75] Inventor: Hans Langen, Düsseldorf, Fed. Rep. of Germany

[73] Assignee: Sack GmbH, Düsseldorf, Fed. Rep. of Germany

[21] Appl. No.: 28,734

[22] Filed: Apr. 10, 1979

Related U.S. Application Data

[63] Continuation of Ser. No. 867,334, Jan. 6, 1978, abandoned.

[30] Foreign Application Priority Data

Jan. 7, 1977 [DE] Fed. Rep. of Germany ....... 2700525
Nov. 4, 1977 [DE] Fed. Rep. of Germany ....... 2749372
Nov. 30, 1977 [DE] Fed. Rep. of Germany ....... 2753286

[51] Int. Cl.³ .............................................. B26D 1/12
[52] U.S. Cl. ........................................ 407/25; 407/31
[58] Field of Search ...................... 407/20, 23, 24, 26, 407/26, 31

[56] References Cited

U.S. PATENT DOCUMENTS 1,495,067  5/1924  Conklin ................................. 407/25
3,740,808  6/1973  Shioya ................................... 407/25

FOREIGN PATENT DOCUMENTS 2034440  4/1971  Fed. Rep. of Germany .
359957  3/1962  Switzerland ............................ 29/103.2

OTHER PUBLICATIONS

*Technische Nachrichten*, Pamphlet 212 of the Wilhelm Fette Co., Apr. 1966.
*Werkstatt und Betrieb*, No. 101, vol. 7, 1968, pp. 409–412, "Current Hobbing Tools", K. Schmalz.
*Industrie-Anzeiger*, 94, No. 14 of Feb. 18, 1972, pp. 284–289, Hoffmeister, "Hob Cutting with Carbides".
*Werkstatt und Betrieb*, No. 108, vol. 5, May 1975, pp. 257–320, Bellman & Stack "Cutting Materials".
*Werkstatt und Betrieb*, vol. 109, No. 5, May 1976, pp. 349–304, Stack & Bellman", "Milling Tools".
Technische Rundschau, No. 35, Aug. 24, 1976, pp. 11 & 13, Schmidthammer, "Wealr of Hobbing Cutters".
Haus der Technik, Published paper 392, Brauning, "Use of Carbides in Milling".

*Primary Examiner*—Harrison L. Hinson
*Attorney, Agent, or Firm*—John J. Dennemeyer

[57] ABSTRACT

The body of a gear hob consists of a plurality of adjacent disc-shaped segments. A helix of successive cutting teeth extends around the body and is formed by the adjoining peripheries of the segments. First and second metal cutter plates are replaceably mounted on the teeth flanks. The first cutter plate is mounted at the top of a respective tooth flank and the second cutter plate is mounted on the opposite flank. The first and second cutters alternate along the helix at each side of the teeth and their cutting paths overlap.

14 Claims, 7 Drawing Figures

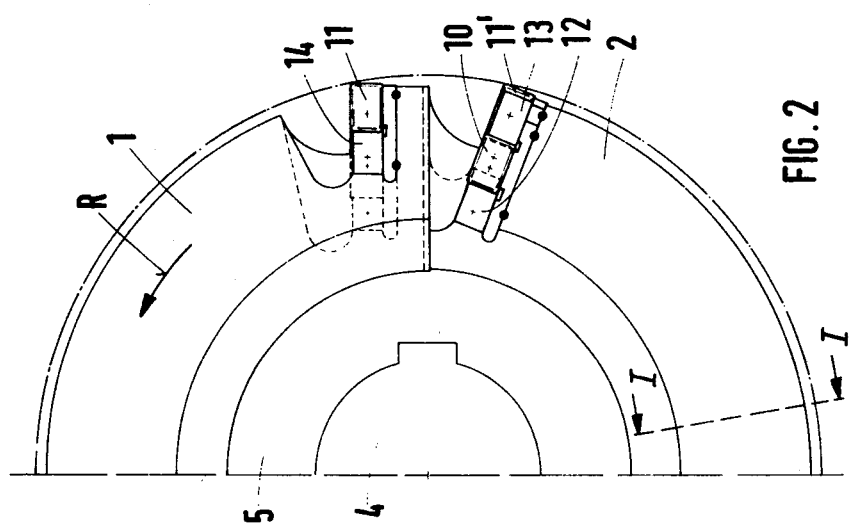
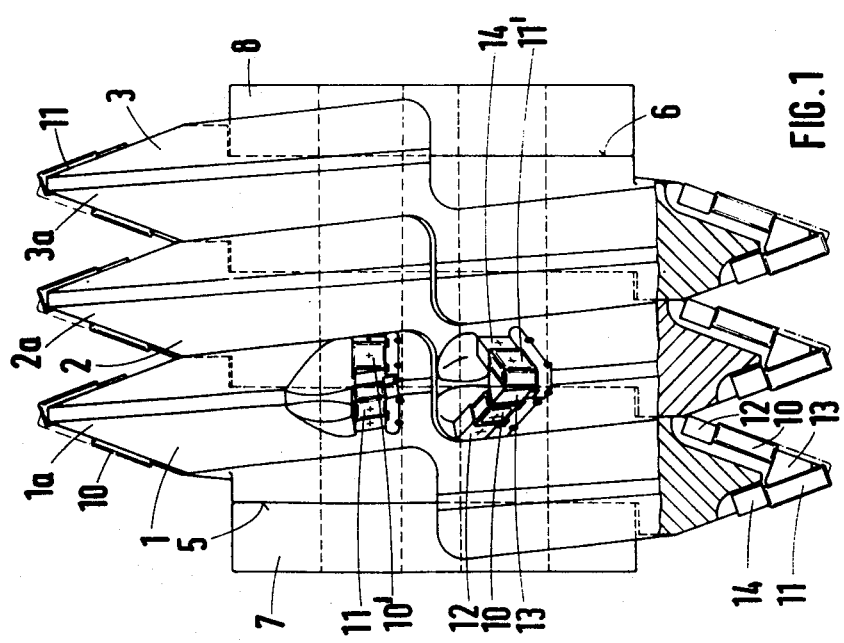

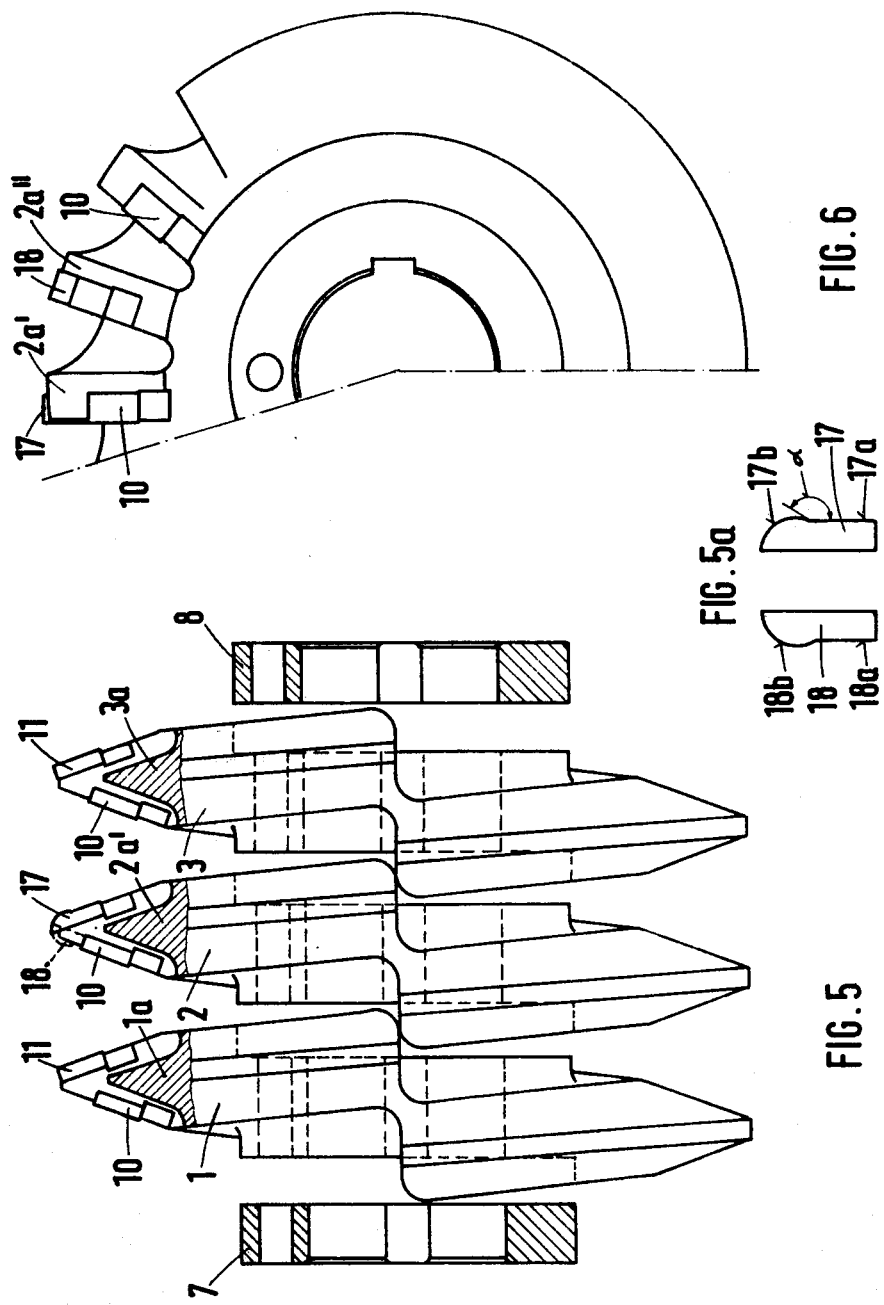

MULTIPLE-PART HOBBING CUTTER

This is a continuation of application Ser. No. 867,334, filed Jan. 6, 1978, now abandoned.

The invention relates to a hobbing cutter for producing large teeth up to approximately module 40. Its object is generally to provide a hobbing cutter of highest economy.

A survey over the rotary gear cutting tools available at present leads to the following state of the art:

For the single-part method, in particular for performing roughing cuts on large-module gear teeth, the side milling cutter is used. Such side milling cutters are also available with a hard-facing in the form of hard metal reversible plates arranged in a staggered manner which render re-grinding of the tool superfluous. Since in a side milling cutter all the teeth undergo the same wear, the use of expensive hard metal reversible plates, such as they are known per se in the technique of cutting, is sensible.

Since the single-part method is time consuming and is therefore mainly employed for cutting teeth on tooth racks, the hobbing cutter is used throughout for cutting teeth on wheels. The hobbing cutter exists as a solid milling cutter of heavy duty high-speed steel, or as so-called rail mills the base body of which consists of normal work-material, whereas the cutting edges consist of heavy duty high-speed steel. Such rail mills permit repeated re-equipment with hard-facing.

In the past, the further development of the hobbing cutter stood obviously under the grinding problem, in particular when the practice was introduced to provide hobbing cutters with blades inserted in a staggered arrangement and intended in particular for very large divisions and cutter dimensions. Because of the staggered arrangement of the blades such milling cutters were not reground in front of the tooth face, as in the case of backed-off milling cutters, but at the outer surfaces of the teeth. For this purpose a special machine was necessary (German Patent Specification No. 576 843, page 1, lines 14–19).

The re-grinding problem led to the creation of the multiple-part hobbing cutter which consists of a plurality of discs provided with plano-parallel end faces and with helical tooth rims corresponding to the milling cutter pitch (German Patent Specification No. 576 843).

The idea of the multiple-part hobbing cutter has recently been revived again, likewise under the point of view of improved facility for repair, hard-faced equipment with securely clamped hard metal blades in a staggered arrangement being proposed (German Offenlegungsschriften 1 752 707 and 1 918 200).

For solving the problem of producing a hobbing cutter of the highest economy, the invention consists in that the hobbing cutter consists of a plurality of discs which are provided with plano-parallel end faces and with helical tooth rims corresponding to the cutter pitch, and the tooth rims of which are equipped with interchangeable hard metal reversible plates disposed in a staggered arrangement, as head and side cutters, the reversible plates being arranged in the succession of the teeth in a right-hand cutting and a left-hand cutting manner and with alternating radial spacing in such a manner that the side-cutting edges of the reversible plates overlap each other during the rotation of the hobbing cutter.

This novel construction of a hobbing cutter is based on the following consideration:

As stated already, the expensive hard-facing with hard metal reversible plates can be justified in a side milling cutter for the single-part method, because there all the teeth are subjected to the same wear. Although now the concept of the known multiple-art hobbing cutter would permit without difficulty, as to the manufacture, the transfer of the reversible plate principle, this has not been considered seriously heretofore for two reasons. Firstly, the production costs of such a hobbing cutter would increase considerably because of the multitude of its teeth. Furthermore it has been assumed in an analogous manner that all the reversible plates of such a hobbing cutter must be reversed from time to time. The recognition carrying the invention and at the same time the surprising effect of the combination claimed consists now in that during each rotation of a hobbing cutter always only one tooth goes over "centre", i.e. cuts on the perpendicular to the cutter axis extending through the centre of the gear wheel and thus must provide the highest cutting power. This tooth wears most, and thus it is unnecessary in a hobbing cutter according to the invention to turn all the reversible plates from time to time, but only that of a single tooth or of a few teeth the reversible plates of which are simultaneously side cutters and head cutters. No measuring pass is required, since the immersion depth of such a head cutting reversible plate remains unchanged after it has been turned. The tool need not be interchanged in order to turn one or a few reversible plates, and accordingly fresh adjustment of the tool is also unnecessary.

In spite of the high investment costs of a hobbing cutter according to the invention, all these advantages are the basis of its high economy not previously attained in operation.

The hard metal reversible plates are preferably inserted on edge, i.e. with a narrow limiting face as leading face. Therefore, they are not subjected to any bending loads during milling, for which reason working may be effected with large cutting speeds and feed speeds. Experiments have shown that in comparison with commercially available single-part hobbing cutters, the machining time required for a large gear wheel can be reduced to one seventh and less. Moreover it was found surprisingly that the teeth receive finishing quality in a single work pass, that is to say they are finished unless ground teeth are required for heavy duty gears.

For large gear wheels, a hobbing cutter having at least three compound helical gear rims is necessary. For the treatment of gear wheels of smaller diameter, i.e. small module, it may be sufficient to employ only one or two discs with helical gear rims.

The invention deals also with the problem of the rounding-off of the tooth base, the so-called protuberance, by means of which the grinding dimension of the tooth flank is determined. It is known that for the hobbing process the engagement conditions of the respective kind of teeth apply, e.g. involute teeth, because each tooth of a hobbing cutter may be regarded as a tooth of a counter gear wheel as to the engagement conditions. In the same way as upon engagement of two gear wheels the engagement path extends ever only a portion of the base flank length—in addition to the entire head flank length—, a hobbing cutter can produce the grip length of the tooth flanks only up to the point of the base flanks which results from the point of intersection of the top circle of the hob and the engagement line (involute teeth) or the rolling circle of the teeth to be produced (cycloidal teeth). The remaining extent of the base flanks in the region of the tooth base continues necessarily by way of a rounding-off as far as the tooth base, and it is just this rounding-off which must be enlarged as rounding-off or protuberance, in order that the supporting tooth flanks—and only these—can be correctly ground. The production of the protuberance involves so to speak a "backing-off milling" of the supporting tooth flanks, in order to render free running-out possible for a tool—in the present case the grinding disc—during a further treatment process.

Heretofore it was necessary to produce the protuberance by means of a special protuberance hobbing cutter in a second operating step. The stock of tools had to comprise for each tooth module not only a special protuberance hob which are more expensive than the normal hobbing cutters, but also a plurality thereof with different rounding-off cutting edges, in order to permit the extent of grinding to be influenced by means of a more or less extensive rounding-off of the tooth base dependently upon the distortion of the teeth of the gear wheel which may have occurred during hardening.

It has been found that the separate protuberance hobbing cutters and the second hobbing process for producing the protuberance may be omitted in a hobbing cutter equipped with hard metal reversible plates according to the invention owing to the fact that according to the invention at least the tooth which runs "over the centre", i.e. the tooth which cuts on the normal to the cutter axis which extends through the centre of the gear wheel, is provided in the region of the point of the tooth with a hard metal reversible plate which possesses a circular arc-shaped cutting edge for rounding-off the tooth base, the radius of the cutting edge being adjusted to the desired rounding-off (protuberance) in the tooth base.

Apart from the considerable advantage as to costs the invention imports the possibility to be able to select from case to case the magnitude of the protuberance simply by interchanging the rounding-off reversible plate or plates of a different diameter. This necessity arises when—as stated already—it is found after hardening of the toothed gear wheel that one or more teeth have been particularly strongly deformed. As a remedy it is then required that the grinding extent of all tooth flanks is increased, in order that also the tooth flanks of distorted teeth are still rendered attainable by the grinding disc. This adjustability upon demand of the protuberance was possible heretofore only by the selection of a special protuberance hob, but only in the gradation which is predetermined by existing protuberance milling cutters of one and the same tooth module.

The rounding-off reversible plate or plates may consist of circular discs which are inserted in the tooth face of the tooth or teeth of the hobbing cutter, which run exactly or approximately "over the centre". Such circular reversible plates have the advantage that they may be rotated simply through 180° in order to bring a fresh circularly shaped cutting edge into operation. However, the teeth provided with rounding-off plates must be treated differently in respect of the seats for the top and side cutters inserted on edge.

In order to permit all teeth of the hobbing cutter to be produced with unchanged characteristic of the successive seats for reversible plates, the invention provides a succession of at least two mirror-symmetrically equal hard metal reversible plates inserted as right-hand and left-hand cutting top and side cutters the straight side-cutting edges of which extend under an obtuse tangential angle into a respective circular-arc-shaped rounding-off edge which overlap during the rotation of the hob. These mirror-symmetrical reversible plates must be fixed in the seats in the teeth, such as they are suitable for teeth without rounding-off plates for the top and side cutters, so that during the machine treatment of the teeth of the hobbing cutter no account must be taken of which teeth are to be fitted with rounding-off plates.

Figure 3:
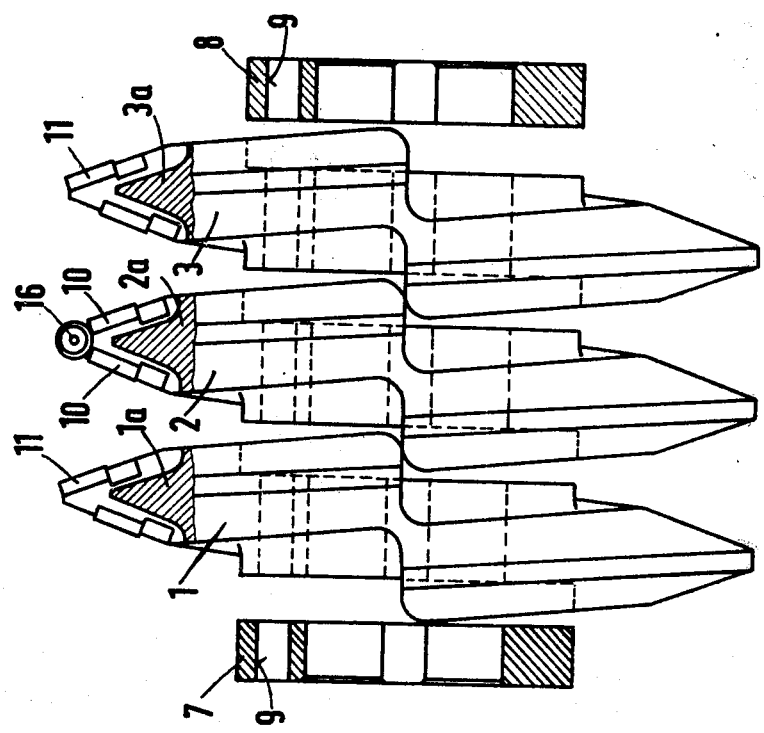

Three constructional examples of a hobbing cutter according to the invention are illustrated in the drawing, and there are shown in:

FIG. 1 a hobbing cutter consisting of three ring discs, in a view from above, partly in section on the line I—I in FIG. 2, FIG. 2 one half of a side view from the lefthand side, FIG. 3 an exploded illustration of the hobbing cutter illustrated in FIG. 1 in a view from above, partly in section, with a circular disc as rounding-off plate, FIG. 4 a side view of the middle ring disc in FIG. 3, approximately one half, from the lefthand side, FIG. 5 an illustration as FIG. 3 with mirror-symmetrically equal rounding-off plates, FIG. 5a a pair of mirror-symmetrical rounding-off plates on an enlarged scale, and FIG. 6 approximately one half of a side view from the left of the middle ring disc in FIG. 5.

The novel multiple-part hobbing cutter consists in all constructions examples of three discs 1, 2 and 3 provided with helical gear rims, the discs being placed together by means of their central bores 4 on a mill mandrel not illustrated, mounted thereon secured against rotation and mutually clamped together. The individual ring discs lie against each other by their plano-parallel side faces, only the outer side face 5 of the disc 1 and the outer side face 6 of the disc 3 being provided with reference numerals (FIG. 1). The assembled set of gear rims secured on the mill mandrel is limited by ring discs 7 and 8, the rings and gear rims being provided with a plurality of bores 9 through which dowel pins are pushed in order to fix the helical gear rims 1a, 2a and 3a to form an uninterrupted screwthread corresponding to the module-dependent pitch of the hobbing cutter.

The principle of construction of the hobbing cutter in respect of its equipment with hard metal reversible plates is explained with reference to FIGS. 1 and 2, as follows:

The gear rims 1a, 2a and 3a are equipped with hard metal reversible plates in a staggered arrangement. In the staggered arrangement, a distinction is made between the side-cutting reversible plates 10 and the top and side-cutting reversible plates 11 which are fixed on their milled out seats in the gear rims by means of screws not illustrated. They are inserted on edge, i.e. with a small limiting face as front face. The hard metal reversible plates are additionally secured against rotation by adjacent filler members 12, 13 and 14.

In the recession of the teeth the reversible plates are arranged in a righthand cutting and a lefthand cutting manner. If, for example, the top and side cutter 11 illustrated in FIG. 2 must be considered at the direction of rotation R of the hob as a lefthand cutting reversible plate, the next following tooth supports a righthand cutting top and side cutter 11'. However, this later-cutting tooth supports a lefthand and side cutting reversible plate 10 at a larger radial spacing from the periphery of the teeth than that of the top and side cutter 11 of the preceding tooth. These alternating radial spacings import the effect that the side cutting reversible plate edges overlap during the rotation of the hob. Since in FIG. 1 the top and side cutting reversible plate 11 forms part of the last tooth of the gear rim 1a of the disc 1 which is visible in the side view according to FIG. 2, the subsequent tooth with the lefthand cutting reversible plate illustrated in FIG. 2 is the first tooth of the gear rim 2a of the disc 2 in FIG. 1. Thus in the side view according to FIG. 2 the preceding portion of the gear rim 1a is omitted from the lower quarter.

In the case of large-module hobbing cutters more than one lefthand cutting or righthand cutting side cutter 10 will have to be provided, in which case however the alternating radial spacing of the reversible plates must always be adjusted, in order that successive side cutting reversible plate edges overlap each other during the rotation.

In the constructional examples reversible plates 10 and 11 of rectangular shape are inserted. Obviously square reversible plates may alternatively be used the eight cutting edges of which may be put into operation by turning, in contrast to four cutting edges in the case of rectangular reversible plates.

In the constructional example according to FIGS. 3 and 4, the gear rims 1a, 2a and 3a are equipped with hard metal reversible plates 10 and 11 in a staggered arrangement, as previously described.

One tooth of the gear rim 2a of the middle toothed disc 2 is provided according to the invention with a circular hard metal reversible plate 16 which is inserted in the face area of the tooth in such a manner that it is capable of shaping the rounding-off in the tooth base in a right-hand cutting as well as a lefthand cutting manner. It is that tooth of the hobbing cutter which runs "over the centre", this being adjusted prior to milling by an axial adjustment of the hobbing cutter. Also one or more teeth adjacent this tooth may be provided with a circular rounding-off plate 16, in order to distribute the cutting work.

As may be seen from FIG. 3, the circular reversible plate 16 displaces the top and side cutter 11 which is normally provided for this tooth and which becomes a pure side cutter 10 on the tooth provided with the circular reversible plate 16. Even for the tooth with the circular reversible plate 16 the rule applies that the side cutting reversible plate edges overlap each other during the rotation of the hob. Since the circular reversible plate 16 has a righthand cutting as well as a lefthand cutting effect, the gaps between the circular reversible plate 16 and the side cutters 10 of the same tooth must be as small as possible in order to be overlapped by top and side cutters 11 and 10 of the subsequent teeth.

Admittedly, the possibility to be able to render operative a plurality of fresh cutting edges of a hard metal reversible plate by turning and rotation, exists for the circular reversible plate 16, but is not of overriding importance. It is more important that the hard metal reversible plate 16 may be interchanged whenever desired with a reversible plate having a different diameter, in order to be able to select the size of the rounding-off or the protuberance in the tooth base and thereby also the grinding dimension from case to case in any desired manner.

The hobbing cutter according to FIG. 5 corresponds to the constructional example according to FIGS. 3 and 4 as to its multiple-part construction. As described already, the gear rims 1a, 2a and 3a are equipped with hard metal reversible plates 10 inserted on edge, as side cutters, and 11 as top and side cutters in a staggered arrangement, with the exception of two successive teeth 2a' and 2a'' of the middle toothed disc 2. As may be seen from FIG. 5, a rounding-off plate 17 inserted on edge is substituted on the first tooth 2a' for a top and side cutter 11, and according to FIG. 5a it has a side cutting edge 17a which transfers under an obtuse tangential angle α to a circular cutting edge 17b by means of which the rounding-off in the tooth base can be treated partially. The next following tooth 2'' carries a rounding-off plate 18 which is mirror-symmetrical to the rounding-off plate 17, at the location at which a top and side cutter would be inserted in the staggered arrangement, which rounding-off plate 18 is likewise provided with a side cutting edge 18a and a circular cutting edge 18b for rounding-off the tooth base. During the rotation of the hob the two circular cutting edges 17b and 18b overlap, so that the tooth base is rounded-off in the same manner as with a circular reversible plate 16 according to FIG. 3. The advantage of this arrangement reside in the fact that the seats for the top and side cutters 11 milled into the toothed disc 2 may be used without difficulty as seats for the rounding-off plates 17 and 18.

For the constructional example according to FIGS. 5 and 6, there applies also that the extent of the desired rounding-off in the tooth base can be produced by interchanging the rounding-off plates 17 and 18, in order to adjust a more or less large grinding dimension. When the rounding-off plates 17 and 18 are to be turned round in order to bring fresh cutting edges into operation, they are simply interchanged with each other, i.e. the righthand cutting rounding-off plate becomes the lefthand cutting rounding-off plate, and vice versa.

What is claimed is:
1. A gear hob comprising:
a body comprising at least one disc-shaped body segment;
a helix of successive teeth extending around said body and formed by the periphery of said body, each said tooth having a flank;
first metal cutter plates replaceably mounted respectively at the top of at least some of said tooth flanks;
second metal cutter plates replaceably mounted at the top of respective opposing tooth flanks, said first and second cutter plates alternating along the helix at opposite sides of at least some of the adjacent teeth and having at least partially overlapping cutting paths; and
at least one said tooth serving to cut on the normal to the cutter axis which extends through the center of the gear wheel and being provided in the region of the apex of said at least one tooth with a further hard-metal reversible plate having an arc-shaped cutting edge for rounding-off the tooth space, the radius of said arc-shaped cutting edge being determined by the desired rounding-off in the tooth base.

2. The gear hob according to claim 1 wherein said reversible plate having an arc-shaped cutting edge comprises a circular disc.

3. The gear hob of claim 1, having a succession of at least two said reversible plates with arc-shaped cutting edges, said at least 2 reversible plates having arc-shaped cutting edges comprising mirror-symmetrical hard-metal reversible plates mounted on respective teeth as right-hand cutting and left-hand cutting top and side cutters.

4. The gear hob of claim 1, wherein said first and second metal cutter plates are rectangularly shaped, reversible plates having at least four usable cutting edges, each said first and second cutter plates being mounted on a respective cutting tooth with one said cutting edge leading in the cutting path.

5. The gear hob of claim 1, wherein a plurality of said disc-shaped body segments are provided, said helix of successive cutting teeth extending around said body and being formed by the adjoining peripheries of said segments.

6. The gear hob of claim 1, having a succession of at least two said reversible plates with arc-shaped cutting edges, said at least 2 reversible plates with arc-shaped cutting edges comprising mirror-symmetrical hard-metal reversible plates mounted on respective teeth as right-hand cutting and left-hand cutting top and side cutters, the straight-side-cutting edges of which extend under an obtuse tangential angle into a respective circular arc-shaped rounding-off edge and which have overlapping cutting paths during the rotation of the cutter.

7. A gear hob comprising:
a body comprising at least one disc-shaped body segment;
a helix of successive teeth extending around said body and formed by the periphery of said body, each said tooth having a leading face, a top and two flanks, and having a seat cut into each leading face and extending along one of said flanks at said top; and
first cutter plates replaceably mounted at the top of respective tooth flanks for cutting both with a top-cutting edge and a single side-cutting edge, said first cutter plates comprising interchangeable hard metal reversible plates having straight edges and being mounted in respective seats in said tooth flanks, each said plate having a broad face and a narrow face, said narrow face serving as a leading face defining said top-cutting and side-cutting edges.

8. The gear hob of claim 7, wherein a plurality of said disc-shaped body segments is provided, said helix of successive cutting teeth extending around said body and being formed by the adjoining peripheries of said segments.

9. A gear hob comprising:
a body comprising at least one disc-shaped body segment;
a helix of successive teeth extending around said body and formed by the periphery of said body, each said tooth having a top and two flanks;
first cutter plates replaceably mounted at the top of respective tooth flanks for cutting both with a top-cutting edge and a side-cutting edge, said first cutter plates comprising interchangeable hard metal reversible plates having straight edges and being mounted on said respective tooth flanks with a narrow limiting face as leading face defining said top-cutting and side-cutting edges; and
second metal cutter plates replaceably mounted at a radial distance inwardly from the top of respective opposing tooth flanks for cutting with a side-cutting edge only, said first and second cutter plates alternating along said helix from left-hand to right-hand tooth flanks and having overlapping cutting paths as to their side-cutting edges.

10. The gear hob of claim 9, wherein said first and second metal cutter plates are rectangularly shaped, reversible plates having at least four usable cutting edges, each said first and second cutter plates being mounted on a respective cutting tooth with one said cutting edge leading in the cutting path.

11. A gear hob comprising:
a body comprising at least one disc-shaped body segment;
a helix of successive teeth extending around said body and formed by the periphery of said body, each said tooth having a top and two flanks; and
first cutter plates replaceably mounted at the top of respective tooth flanks for cutting both with a top-cutting edge and a side-cutting edge, said first cutter plates comprising interchangeable hard metal reversible plates having straight edges and being mounted on said respective tooth flanks with a narrow limiting face as leading face defining said top-cutting and side-cutting edges,
wherein at least one said tooth serves to cut on the normal to the cutter axis which extends through the center of the gear wheel, said at least one tooth being provided in the region of the apex thereof with a further hard-metal reversible plate having an arc-shaped cutting edge for rounding-off the tooth space, the radius of said arc-shaped cutting edge being determined by the desired rounding-off in the tooth base.

12. The gear hob according to claim 11, wherein said reversible plate having an arc-shaped cutting edge comprises a circular disc.

13. The gear hob of claim 11, having a succession of at least two said reversible plates with arc-shaped cutting edges, said at least 2 reversible plates having arc-shaped cutting edges comprising mirror-symmetrical hard-metal reversible plates mounted on respective teeth as right-hand cutting and left-hand cutting top and side cutters.

14. The gear hob of claim 11, having a succession of at least two said reversible plates with arc-shaped cutting edges, said at least 2 reversible plates with arc-shaped cutting edges comprising mirror-symmetrical hard-metal reversible plates mounted on respective teeth as right-hand cutting and left-hand cutting top and side cutters, the straight-side-cutting edges of which extend under an obtuse tangential angle into a respective circular arc-shaped rounding-off edge and which have overlapping cutting paths during the rotation of the cutter.

* * * * *

UNITED STATES PATENT AND TRADEMARK OFFICE
CERTIFICATE OF CORRECTION

PATENT NO. : 4,218,159

DATED : August 19, 1980

INVENTOR(S) : Hans LANGEN

It is certified that error appears in the above—identified patent and that said Letters Patent is hereby corrected as shown below:

In the specification, column 4, line 61, delete "In the recession of the teeth" and substitute therefor -- In the succession of the teeth --.

Signed and Sealed this

Twenty-third Day of December 1980

[SEAL]

Attest:

SIDNEY A. DIAMOND

Attesting Officer

Commissioner of Patents and Trademarks